US011945664B2

(12) United States Patent
Vogt et al.

(10) Patent No.: US 11,945,664 B2
(45) Date of Patent: Apr. 2, 2024

(54) PNEUMATIC DISPATCH STATION HAVING A TOOL CHANGER

(71) Applicant: Swisslog Healthcare GmbH, Westerstede (DE)

(72) Inventors: Frederick Vogt, Wilhelmshaven (DE); Patrick Hellpap, Westerstede (DE); Maik Reddemann, Westerstede (DE)

(73) Assignee: Swisslog Healthcare GmbH, Westerstede (DE)

( * ) Notice: Subject to any disclaimer, the term of this patent is extended or adjusted under 35 U.S.C. 154(b) by 410 days.

(21) Appl. No.: 17/602,802

(22) PCT Filed: Apr. 8, 2020

(86) PCT No.: PCT/EP2020/059963
§ 371 (c)(1),
(2) Date: Oct. 11, 2021

(87) PCT Pub. No.: WO2020/208055
PCT Pub. Date: Oct. 15, 2020

(65) Prior Publication Data
US 2022/0153538 A1     May 19, 2022

(30) Foreign Application Priority Data
Apr. 11, 2019   (DE) .................... 10 2019 205 185.5

(51) Int. Cl.
*B65G 51/30*     (2006.01)
*B65G 51/28*     (2006.01)

(52) U.S. Cl.
CPC ............. *B65G 51/30* (2013.01); *B65G 51/28* (2013.01)

(58) Field of Classification Search
CPC ... B65G 1/30; B65G 1/28; B65G 1/26; B65G 1/22; B65G 1/04; B65G 1/06; B65G 1/10;
(Continued)

(56) References Cited

U.S. PATENT DOCUMENTS

| | | | | |
|---|---|---|---|---|
| 5,209,609 A | * | 5/1993 | Lang ...................... | B65G 51/32 406/76 |
| 2011/0255945 A1 | * | 10/2011 | Siddle .................. | G07D 11/165 414/751.1 |
| 2019/0352106 A1 | * | 11/2019 | Dahl ...................... | B65G 51/08 |

FOREIGN PATENT DOCUMENTS

| CN | 205114510 U | 3/2016 |
|---|---|---|
| DE | 10 2009 003 510 A1 | 8/2010 |

(Continued)

OTHER PUBLICATIONS

European Patent Office; Search Report in related International Patent Application No. PCT/EP2020/059963 dated Jul. 24, 2020; 2 pages.

(Continued)

*Primary Examiner* — Glenn F Myers
(74) *Attorney, Agent, or Firm* — Dorton & Willis, LLP

(57) ABSTRACT

A pneumatic dispatch station includes a station housing with receiving and output points, and a gripping device automatically movable within the station housing between the receiving and output points and configured to automatically grip a pneumatic tube capsule that has arrived at the receiving point and move the capsule to the output point. The pneumatic dispatch station further includes at least one removal point adjacent the output point and a tool changer assigned to the output point and having at least one first emptying tool and a second emptying tool. The tool changer includes a drive device designed to automatically move the first or second emptying tool into a working position, wherein the (Continued)

emptying tool is aligned with a pneumatic tube capsule positioned at the output point to output an object in the pneumatic tube capsule, so that the object reaches the removal point.

11 Claims, 7 Drawing Sheets

(58) Field of Classification Search
CPC ......... B65G 1/32; G07F 19/201; G07F 19/20; G07D 11/165; G07D 11/0087
USPC ................................................ 414/416.01
See application file for complete search history.

(56) References Cited

FOREIGN PATENT DOCUMENTS

| | | | |
|---|---|---|---|
| DE | 102015111533 | A1 | 2/2016 |
| EP | 2657160 | A1 | 10/2013 |
| EP | 2 620 296 | B1 | 10/2014 |
| EP | 3 056 457 | A1 | 8/2016 |
| WO | 2011 078762 | A1 | 6/2011 |

OTHER PUBLICATIONS

German Patent Office; Search Report in related German Patent Application No. 10 2019 205 185.5 dated Dec. 10, 2019; 5 pages.
German Patent Office; Office Action in related German Patent Application No. 10 2019 205 185.5 dated Jan. 4, 2023; 7 pages.

* cited by examiner

PNEUMATIC DISPATCH STATION HAVING A TOOL CHANGER

CROSS-REFERENCE TO RELATED APPLICATIONS

This application is a national phase application under 35 U.S.C. § 371 of International Patent Application No. PCT/EP2020/059963, filed Apr. 8, 2020 (pending), which claims the benefit of priority to German Patent Application No. DE 10 2019 205 185.5, filed Apr. 11, 2019, the disclosures of which are incorporated by reference herein in their entirety.

TECHNICAL FIELD

The invention relates to a pneumatic dispatch station, comprising a station casing with a receiving point and an output point, and with a gripping device which can be moved automatically within the station casing between the receiving point and the output point and which is designed to automatically grip a pneumatic tube capsule that has arrived at the receiving point and move said capsule to the output point, the pneumatic dispatch station also comprising at least one removal point adjacent to the output point.

BACKGROUND

EP 2 620 296 B1 describes a device for checking the weight of a pneumatic tube capsule with a lifting device for lifting the pneumatic tube capsule and with a detection device for detecting a raised position of the pneumatic tube capsule, the lifting device comprising an electromagnetic drive.

WO 2011/078762 A1 describes a device comprising a charging station for automatically filling cylindrical capsules with objects to which addresses have been given, these capsules being suitable for a pneumatic pipe transport system and each capsule comprising two openable end pieces and a transponder with readable information about an individual capsule identity. This charging station also comprises a gripping device and a transfer device, via which the gripping device for gripping an object is automatically movable relative to a capsule in a first direction through a first capsule end piece opening in order to grip an object through a second end piece opening of the capsule, before it is then movable relative to the capsule in a second direction which is suitable for pulling the object into the capsule through the second end piece opening. The gripping device is designed to release the object inside the capsule and then move, relative to the capsule, out of the first capsule end piece opening.

SUMMARY

The object of the invention is to create a pneumatic dispatch station which works particularly reliably and, in particular, allows the objects to be transported through the pneumatic tube capsule to be reliably output.

The object is inventively achieved by a pneumatic dispatch station, comprising a station casing with a receiving point and an output point, and with a gripping device which can be moved automatically within the station casing between the receiving point and the output point and which is designed to automatically grip a pneumatic tube capsule that has arrived at the receiving point and to move said capsule to the output point, the pneumatic dispatch station also comprising at least one removal point adjacent to the output point, the pneumatic dispatch station also comprising a tool changer assigned to the output point, which tool changer comprises at least one first emptying tool and a second emptying tool that differs from the first emptying tool, the tool changer comprising a drive device which is designed to automatically move the first emptying tool or the second emptying tool optionally into a working position in which the emptying tool selected in each case is aligned with respect to a pneumatic tube capsule positioned at the output point, in order, by means of an actuating movement of the selected emptying tool, to output an object to be transported that is present in the pneumatic tube capsule, so that the object to be transported that is output from the pneumatic tube capsule reaches the removal point.

The receiving point forms a space portion or a chamber or a storage space within the station casing of the pneumatic dispatch station, that is to say, that location within the pneumatic dispatch station where the pneumatic tube capsule arrives.

In an analogous manner, the output point forms a space portion or a chamber or a storage space within the station casing of the pneumatic dispatch station, i.e., the point within the pneumatic dispatch station where the pneumatic tube capsule is opened and the contents of the pneumatic tube capsule, i.e., the object to be transported or the plurality of objects to be transported, is automatically removed.

The gripping device automatically transfers the pneumatic tube capsule that has arrived from the receiving point to the output point. This can take place in particular after an information carrier of the pneumatic tube capsule that has arrived at the pneumatic dispatch station has been read out automatically in the region of the receiving point.

The gripping device can either be designed for translational displacement of the pneumatic tube capsule from the receiving point to the output point, or it can be designed for pivoting the pneumatic tube capsule in a rotary manner from the receiving point to the output point. If necessary, an overlapping movement with translational and rotational movement components can also be used. In the case of a translational displacement of the pneumatic tube capsule from the receiving point to the output point, the gripping device can be mounted on a linear unit so that it is automatically driven and linearly adjustable. The gripping device can, for example, comprise two gripper arms which are mounted so as to be adjustable in relation to one another, so that the pneumatic tube capsule can be gripped in a clamping manner from opposite sides. For this purpose, the two gripper arms can either be driven separately by a motor, both gripper arms connected via a coupling gear and driven by a single common motor, or, if necessary, only a single gripper arm can be driven and the second gripper arm can be rigidly attached. An index device can be assigned to each gripper arm, wherein the gripping device can comprise at least one sensor assigned to the indexing device in order to collectively detect the current open position or closed position of the particular gripper arm or of the two gripper arms.

A removal point is assigned to the output point. At the output point, the at least one object to be transported is preferably ejected out of the pneumatic tube capsule by being ejected in a vertical direction downward. It can therefore preferably be provided that the removal point assigned to the output point is arranged below the output point. As a result, the object to be transported that is ejected from the pneumatic tube capsule can reach the removal point by means of gravity, i.e., in free fall. The removal point can be arranged directly below the output point. In a modification, the removal point can be arranged offset with respect to the output point, wherein, for example, a slide, a conveyor belt or some other conveying device arranged between the output point and the removal point can be interposed. In this way, the object to be transported falling from the output point can slide into the removal point.

The working position of the first emptying tool and the second emptying tool can preferably be characterized in that the first emptying tool or the second emptying tool is located directly vertically above the pneumatic tube capsule positioned at the output point. In this case, the first emptying tool or the second emptying tool can penetrate into the cavity of the open pneumatic tube capsule by a mere vertical downward movement in order to downwardly push out or eject the object to be transported located in the pneumatic tube capsule. In this state, both the upper capsule cover and the lower capsule cover are in an open position.

In a preferred embodiment, the pneumatic dispatch station can comprise an information acquisition device which is designed to detect an information carrier of a pneumatic tube capsule that has arrived in the pneumatic dispatch station by reading out at least one piece of information from the information carrier by means of the information acquisition device, the drive device of the tool changer being designed to move either the first emptying tool or the second emptying tool automatically into the working position in a manner controlled by a control device depending on the information read out by the information acquisition device.

The information carrier is arranged on the pneumatic tube capsule. In particular, the information carrier can be arranged on the basic casing, that is to say on the hollow tubular piece of the pneumatic tube capsule or on one or both of its two capsule covers. In the simplest case, the information carrier can be a sticker with a code, in particular a barcode or a QR code. As an alternative or in addition, the information carrier can also be, for example, a chip, a transponder or an RFID tag. In this respect, the information carrier can preferably be read out contactlessly. If necessary, the information acquisition device can accordingly be a scanner, in particular a laser scanner, a camera or an RFID reader.

The control device can be integrated into the station casing of the pneumatic dispatch station. In this respect, the control device can be part of the pneumatic dispatch station. Alternatively, the control device can also be arranged separately from the pneumatic dispatch station and only be connected to the pneumatic dispatch station, i.e., communicate with it, for example by wire or wirelessly.

The tool change can comprise a carriage that is automatically adjustable in the station casing, on which carriage the first emptying tool and the second emptying tool are arranged adjacent to one another, the carriage being adjustable back and forth between a first carriage position, in which the first emptying tool is in its working position, and a second carriage position, in which the second emptying tool is in its working position.

The tool change can either be configured for translational adjustment of the first emptying tool and the second emptying tool, or it can be designed for rotating the first emptying tool and the second emptying tool. If necessary, an overlapping movement with translational and rotational movement components can also be used for adjusting the first emptying tool and the second emptying tool by means of the tool change.

The first emptying tool can comprise at least one height-adjustable finger, the height of which is automatically adjustable on a first lifting carriage by means of a first motor, and specifically at least into a first height position, in which the at least one finger is in a storage position away from the output point, so that a pneumatic tube capsule can be brought to the output point by means of the gripping device, and a second height position, in which the at least one finger engages into a pneumatic tube capsule positioned and opened at the output point in order to output the object to be transported that is present in the pneumatic tube capsule.

The first emptying tool can comprise at least one height-adjustable finger. This means that in the simplest embodiment, the first emptying tool can comprise just a single finger. Alternatively, however, the first emptying tool can preferably comprise two, three or more fingers. For example, variants with 6, 8, 10 or 12 fingers can be provided. The plurality of fingers can in particular be grouped in pairs, in rows and columns and/or offset with respect to one another, arranged in a cross shape and/or in a star shape. In general, the plurality of fingers can be formed by straight rods, which are preferably all grouped parallel to one another. In general, all existing fingers are raised or lowered together. The vertically adjustable fingers can be passively adjustable or driveless, i.e., they can be configured without an active drive. The height-adjustable fingers can accordingly be mounted so that they can slide easily within a finger guide.

The at least one finger can be vertically displaceably mounted in a finger guide connected to the first lifting carriage, the at least one finger being provided at its upper end with a weight and/or a stop, the at least one finger, the weight and/or the stop being designed to drive the at least one finger into its second height position by means of the gravitational action of the dead weight of the at least one finger, the weight and/or the stop and, due to the height-adjustable mounting by means of the finger guide, the at least one finger can deviate in the direction of the first height position if the lifting carriage moves downward and the output force necessary for outputting the object to be transported from the pneumatic tube capsule exceeds the weight force structurally predetermined by the dead weight of the at least one finger, the weight and/or the stop.

If the at least one finger or the plurality of fingers comprise a sufficient dead weight, a related separate weight can optionally be dispensed with if appropriate. However, if, for example, the fingers are made of relatively light plastics, weights, i.e., additional weights, for example in the form of metal bodies, in particular stainless-steel cylinders, can be provided at the upper ends of the rod-shaped fingers. In order for the fingers to be able to be lifted by the lifting carriage or the finger guide, the fingers each have at least one stop so that they can be lifted evenly.

The pneumatic dispatch station can comprise a position sensor assigned to the at least one finger, which position sensor is designed to detect a lifting of the at least one finger relative to the finger guide if, while the lifting carriage is being lowered, the finger guide moves from the first height position for the at least one finger to the second height position for at least one finger.

The position sensor or the position sensors is/are designed to be able to detect a relative movement of the fingers or of a particular finger with respect to the finger guide. Normally, all fingers would penetrate the open pneumatic tube capsule evenly, so that all fingers with their stops remain uniformly positioned relative to the finger guide and the position sensor or position sensors do not perceive any movement of the fingers. However, if at least one finger hits an obstacle, such as an object to be transported jammed in the pneumatic tube capsule, the finger or fingers in question is/are raised relative to the finger guide and the position sensor or position sensors perceive a movement of the fingers in question. This indicates a fault, which can then be signaled automatically.

The second emptying tool can comprise a height-adjustable brush which is automatically adjustable in height on a second lifting carriage by means of a second motor, at least into a first height position in which the brush is in a storage position away from the output point so that a pneumatic tube capsule can be brought to the output point by means of the gripping device, and a second height in which a pneumatic tube capsule positioned and opened at the output point is penetrated by the brush.

The pneumatic dispatch station can in all versions comprise an opening device assigned to the output point which is designed to open both a first capsule cover present at the upper end of the pneumatic tube capsule and to open a second capsule cover present at the opposite lower end of the pneumatic tube capsule.

The pneumatic dispatch station can in all versions comprise a separator arranged below the output point which is designed, depending on the information read out by the information acquisition device from the information carrier of the pneumatic tube capsule that has arrived at the pneumatic dispatch station, to output the object to be transported from the pneumatic tube capsule by means of the first emptying tool or the second emptying tool, either into a first output chute of the pneumatic dispatch station or into a second output chute of the pneumatic dispatch station that differs from the first output chute.

The output point, the removal point and/or the separator can comprise a fault sensor which is designed to detect an object to be transported that is stuck at the output point, the removal point and/or the separator and to generate a fault signal.

An exemplary sequence of the arrival and handling of a pneumatic tube capsule in a typical configuration of an inventive pneumatic dispatch station can be described as follows.

First, the pneumatic tube capsule arrives on a motorized pusher in the pneumatic dispatch station. The motorized pusher forms a front end at the end of the pneumatic dispatch tube at which the incoming pneumatic tube capsule is braked and stopped. For this purpose, the motorized pusher can comprise a drive-operated slide plate which is open when the pneumatic tube capsule is being conveyed in the pneumatic dispatch tube, so that air can be sucked in from outside the pneumatic dispatch tube or air can be blown out of the pneumatic dispatch tube, depending on the situation. In the closed position of the sliding plate, the sliding plate at least partially or completely closes the open end of the pneumatic dispatch tube, so that when an approaching pneumatic tube capsule arrives, an air cushion with increased air density is generated by the back pressure of air and the pneumatic tube capsule is braked and gently stopped against this air cushion. After the pneumatic tube capsule has come to a standstill, at least approximately or completely, the motorized pusher opens automatically and the pneumatic tube capsule can reach the adjacent receiving point.

The receiving point forms a space portion or a chamber or a storage space within the station casing of the pneumatic dispatch station. A reception reading is carried out at this receiving point when the transport is completed. The reception reading can comprise an optical detection of the pneumatic tube capsule and/or a reading of an information carrier, such as an RFID transponder, located in the capsule head or in one of the capsule covers of the pneumatic tube capsule.

The particular position of the separator or its adjustable flap to a first position or a second position is automatically set depending on the information stored in the system for the current object of transport. Based on the same information, a tool is selected so that, depending on the pneumatic tube capsule identified in the system, the pneumatic tube capsule that has arrived at the pneumatic dispatch station is emptied either by means of the first emptying tool or the second emptying tool when it is at the output point.

Before that, however, when the motorized pusher valve is opened, the pneumatic tube capsule is first transferred to an elevator mechanism. The pneumatic tube capsule is lowered in the elevator mechanism and placed on a turntable. A gripping device which is, for example adjustably mounted on a linear unit, initially holds and grips the pneumatic tube capsule located on the turntable. The pneumatic tube capsule located on the turntable is brought into the desired correct position by turning so as to be detected, for example, by a station-side reed contact which, when the pneumatic tube capsule is in the correct rotational position, detects a magnet of the pneumatic tube capsule arranged at a discrete point on the circumference of the pneumatic tube capsule, so that later the capsule covers on the opening device are already in the correct orientation and can therefore be opened automatically.

The gripper on the linear unit now grabs the pneumatic tube capsule and moves it to the opening device.

The capsule covers are rotated with a rotational movement about the axis of rotation of the capsule cover attachment, for example at the removal point by means of, in particular, guide rollers, which are each rotatably mounted on a pivotable opening fork of the opening device in order to pivot open the capsule cover, so that the interior of the pneumatic tube capsule is accessible. The direction of rotation for the two opposite capsule covers can preferably be executed inversely in order to move the opposite capsule covers simultaneously into their particular open position. The end positions of the fully opened capsule cover can be detected, for example, by appropriate sensors on cams that are located on the drive shafts of the pivotable opening forks.

The particular emptying tool which is to be used depending on the pneumatic tube capsule or depending on the transported object is moved vertically, for example from top to bottom, through the pneumatic tube capsule for the ejection of the contents, i.e., the object to be transported, thereby ensuring that the pneumatic tube capsule can be emptied. After reaching the end position, the used emptying tool is moved back vertically from bottom to top into its starting position after the contents, i.e., the object to be transported, have been ejected. In the same way as the pneumatic tube capsule is opened, the capsule cover closes in the opposite direction of rotation.

A separator located under the opening device allows the received content to be separated according to criteria specified by the customer.

The pneumatic tube capsule is then moved by the automatically movable gripping device, for example to an elevator of the pneumatic dispatch station, i.e., to a sending point of the pneumatic dispatch station. For example, an optical sensor can detect the pneumatic tube capsule and initiate the sending operation. The pneumatic tube capsule is then moved upward with the help of an elevator mechanism and then fed back into the pneumatic dispatch tube of the pneumatic dispatch system for its removal.

A specific embodiment of the invention is explained in more detail in the following description with reference to the accompanying figures. Specific features of this embodiment can represent general features of the invention regardless of the specific context in which they are mentioned, optionally also considered individually or in further combinations.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

FIGS. 1 to 7c show an exemplary representative embodiment of an inventive pneumatic dispatch station 1.

Figure 1:
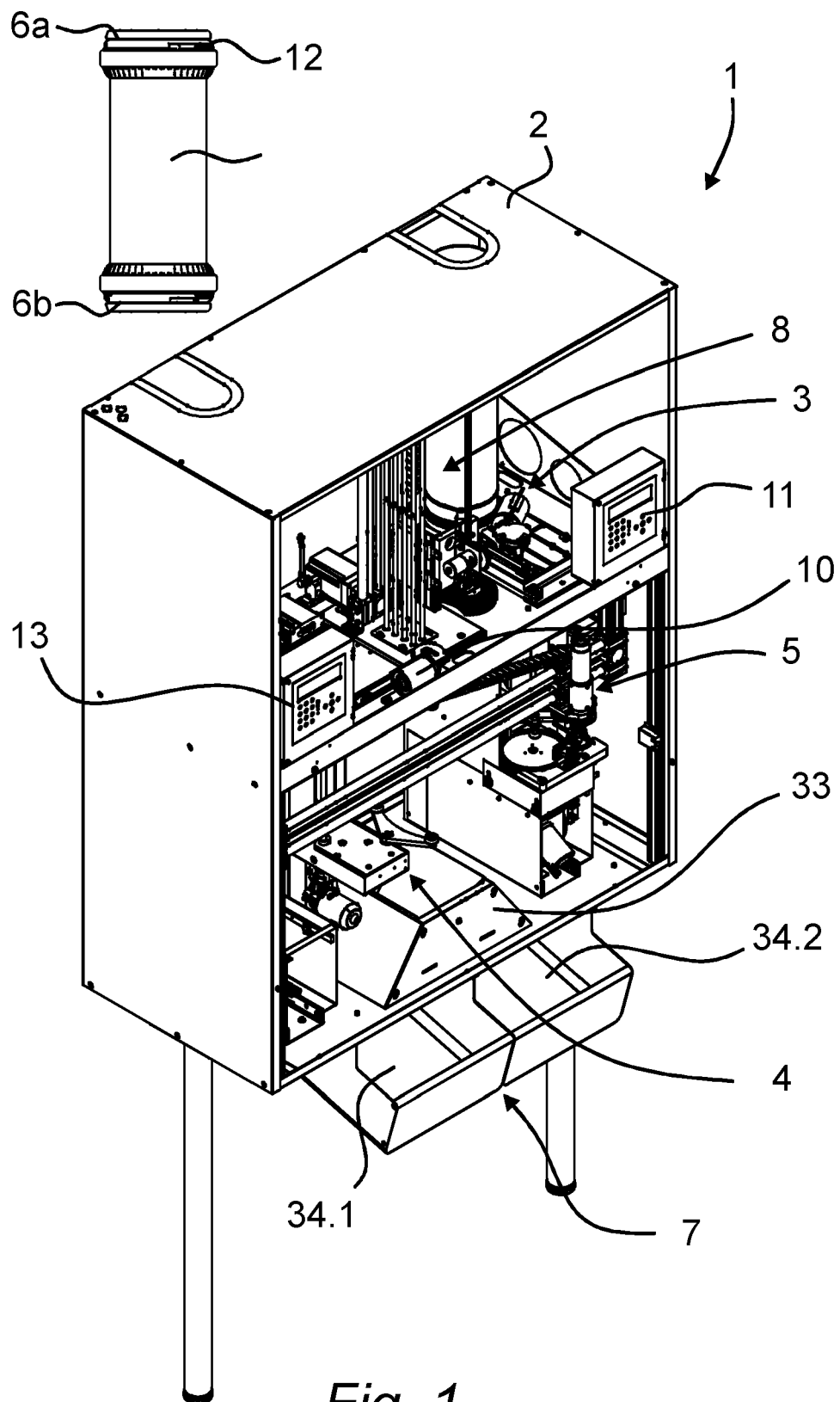
FIG. 1 is a perspective view of an exemplary inventive pneumatic dispatch station with the front cover removed and with an exemplary pneumatic tube capsule.
Figure 2:
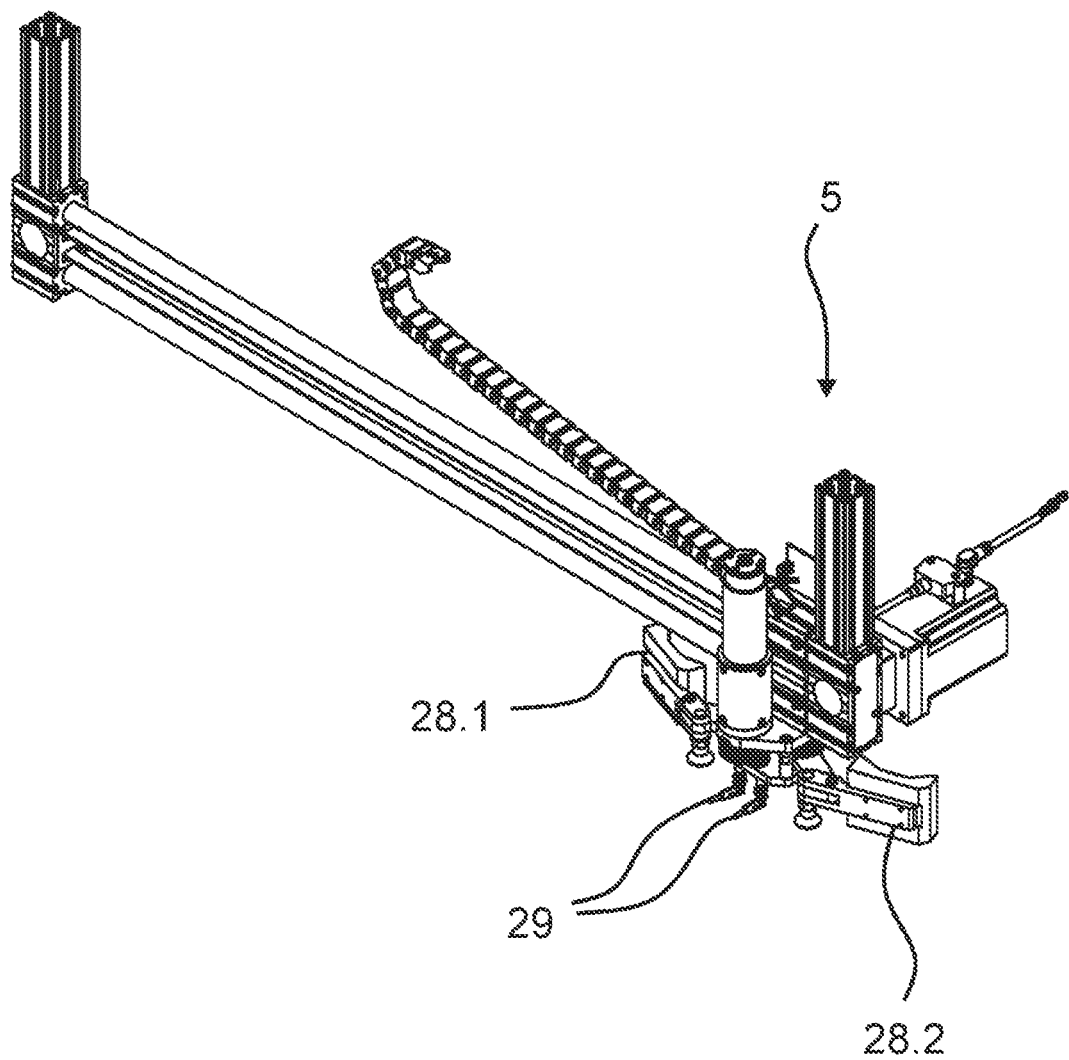
FIG. 2 is a perspective partial view of an exemplary inventive automatically movable gripping device of the pneumatic dispatch station according to FIG. 1.

As shown in FIG. 1, the pneumatic dispatch station 1 has a station casing 2 with a receiving point 3 and an output point 4. The pneumatic dispatch station 1 also has a gripping device 5 that can be moved automatically in the station casing 2 between the receiving point 3 and the output point 4.

The gripping device 5 is designed to automatically grip a pneumatic tube capsule 6 that has arrived at the receiving point 3 and to move it to the output point 4.

The pneumatic dispatch station 1 also comprises at least one removal point 7 adjacent to the output point 4.

Figure 4:
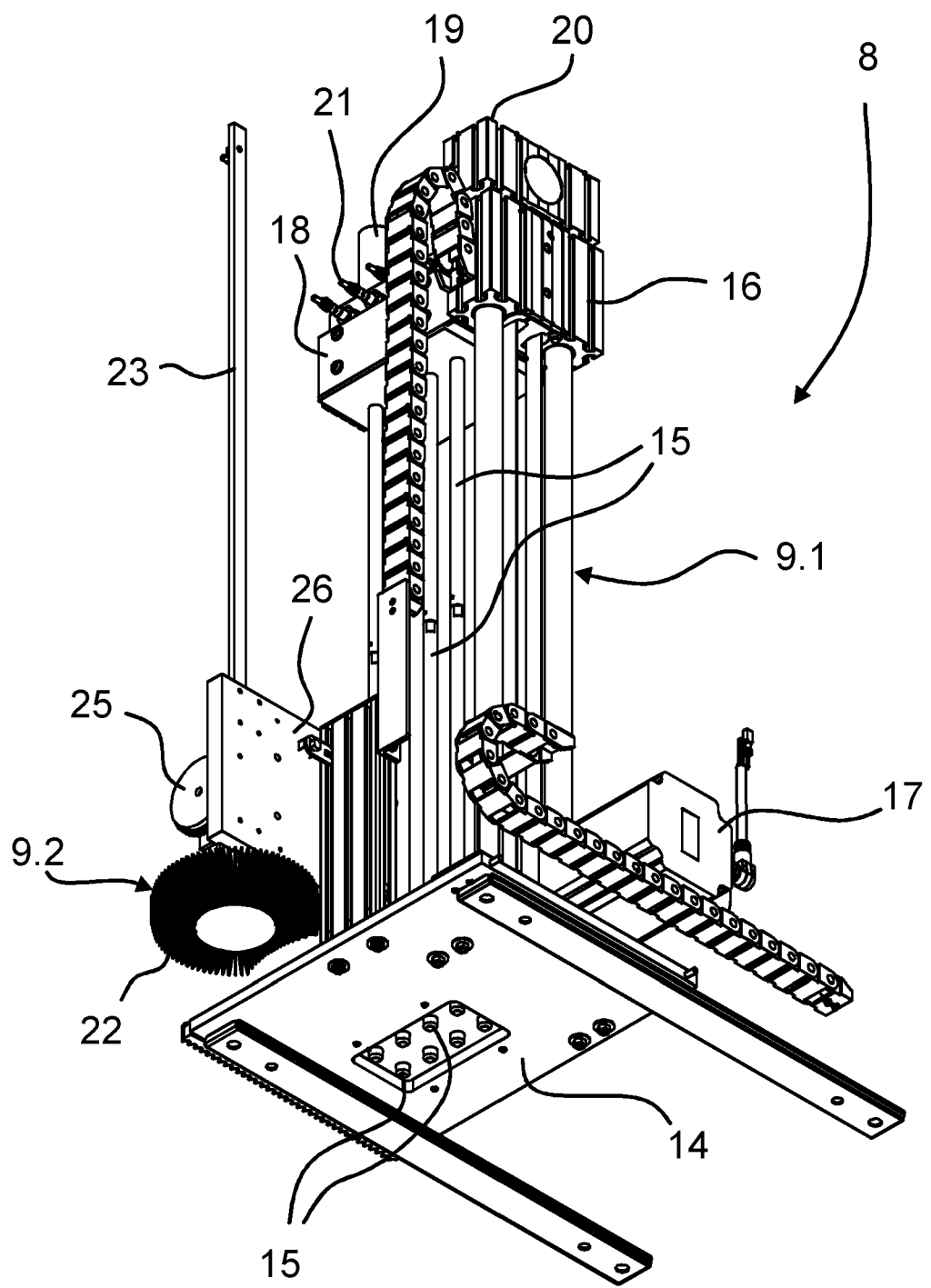
FIG. 4 is a perspective partial view of an exemplary inventive tool changer of the pneumatic dispatch station according to FIG. 1 with a first lifting carriage for a finger tool in a view from below.
Figure 5:
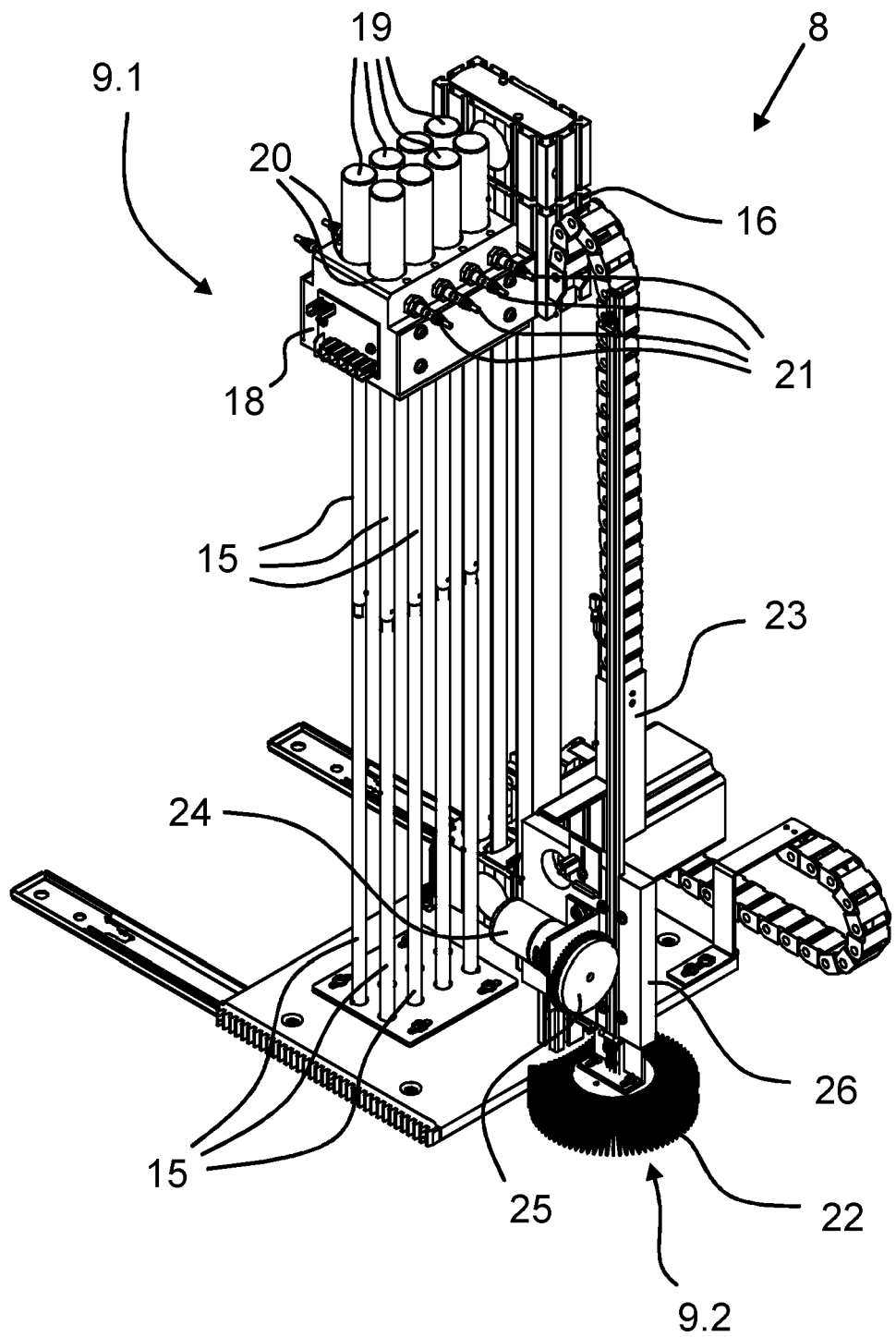
FIG. 5 is a perspective partial view of an exemplary inventive tool changer of the pneumatic dispatch station according to FIG. 1 with a first lifting carriage for a finger tool in a view from above.
Figure 6:
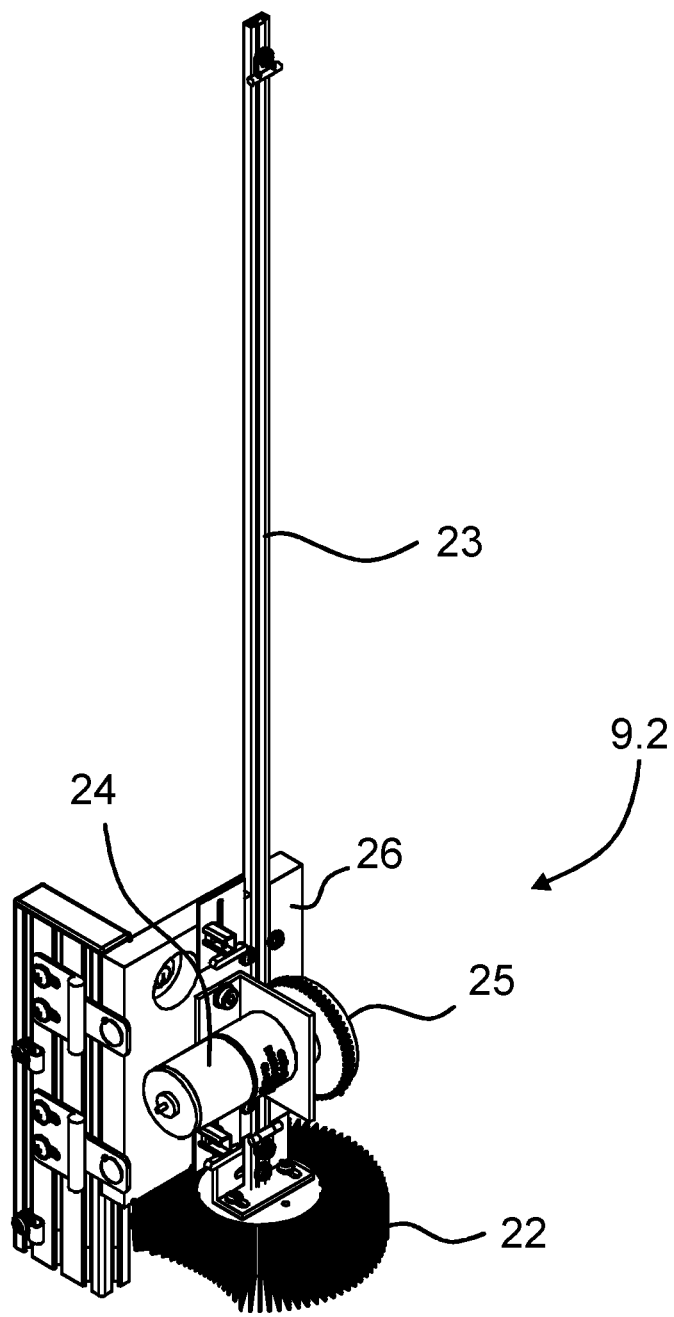
FIG. 6 is a perspective partial view of the exemplary inventive tool changer of the pneumatic dispatch station according to FIG. 1 with a second lifting carriage for a brush tool that differs from the first lifting carriage for a finger tool.

The pneumatic dispatch station 1, as shown in particular in FIGS. 4 to 6, inventively has a tool changer 8 assigned to the output point 4 which comprises at least one first emptying tool 9.1 and a second emptying tool 9.2 that differs from the first emptying tool 9.1.

The tool changer 8 (in particular FIGS. 4 to 6) has a drive device 10 which is designed to automatically move the first emptying tool 9.1 or the second emptying tool 9.2 optionally into a working position in which the emptying tool 9.1, 9.2 selected in each case is aligned with respect to a pneumatic tube capsule 6 positioned at the output point 4, in order, by means of an actuating movement of the selected emptying tool 9.1, 9.2, to output an object to be transported that is present in the pneumatic tube capsule 6, so that the object to be transported that is output from the pneumatic tube capsule 6 reaches the removal point 7.

An information acquisition device 11 of the pneumatic dispatch station 1 is designed to detect an information carrier 12 of a pneumatic tube capsule 6 that has arrived in the pneumatic dispatch station 1, to read out signals or data from the information carrier 12 and to process them, at least one piece of information being read out from the information carrier 12 of the pneumatic tube capsule 6 by means of the information acquisition device 11, for example wirelessly by means of an antenna arranged in the vicinity of the incoming pneumatic tube capsule 6, the drive device 10 of the tool changer 8 being designed to automatically move either the first emptying tool 9.1 or the second emptying tool 9.2 into the working position in a manner controlled by a control device 13 depending on the information read out by the information acquisition device 11. The control device 13 can, as shown in FIG. 1, at least partially or completely form part of the pneumatic dispatch station 1 or it can also be arranged separately from the pneumatic dispatch station 1, for example in the form of a system controller (PLC), not shown in detail, remote from the pneumatic dispatch station 1.

To this end, the tool change 8 comprises a slide 14 (FIG. 4) which is automatically adjustable in the station casing 2 and on which the first emptying tool 9.1 and the second emptying tool 9.2 are arranged adjacent to one another, the carriage 14 can be moved back and forth between a first carriage position, in which the first emptying tool 9.1 is in its working position, and a second carriage position, in which the second emptying tool 9.2 is in its working position.

As shown in particular in FIGS. 4 and 5, the first emptying tool 9.1 has at least one height-adjustable finger 15—in the case of the present embodiment exactly eight fingers 15—which are automatically adjustable in height on a first lifting carriage 16 by means of a first motor 17, namely at least into a first height position, in which the fingers 15 are in a storage position away from the output point 4 so that a pneumatic tube capsule 6 can be brought to the output point 4 by means of the gripping device 5, and a second height position, in which the fingers 15 engage in a pneumatic tube capsule 6 positioned and opened at the output point 4 in order to output the object to be transported that is present in the pneumatic tube capsule 6.

The fingers 15 are vertically displaceably mounted in a finger guide 18 connected to the first lifting carriage 16, the fingers 15 each being provided with a weight 19 and/or a stop 20 at their upper ends, the fingers 15, the weights 19 and the stops 20 being designed to drive the assigned finger 15 into its second height position by means of the gravitational effect of the dead weight of the particular finger 15, the particular weight 19 and/or the particular stop 20, and, due to the height-adjustable mounting by means of the finger guide 18, the finger 15 can deviate in the direction of the first height position when the lifting carriage 16 moves downward and the output force necessary to output the object to be transported from the pneumatic tube capsule 6 exceeds the weight force predetermined by the dead weight of the at least one finger 15, of the weight 19 and/or of the stop 20. In this respect, the weights 19 are each arranged at an upper end of each rod-shaped finger 15. The weights 19 not only provide additional mass in order to increase the weight, but in this special embodiment the weights 19 are also enlarged in their diameters compared to the diameters of the fingers 15, so that, at the relevant upper end of the finger, a shoulder or a step is formed in the diameter which represents the stop 20 and the fingers 15 are thus held in the finger guide 18, i.e., the fingers 15 are prevented from sliding down completely from the finger guide 18.

In the embodiment shown, the pneumatic dispatch station 1 also has position sensors 21 assigned to the fingers 15 which sensors are each designed to detect a lifting of the particular finger 15 relative to the finger guide 18 if the finger guide 18 moves from the first height position for the finger 15 to the second height position for the finger 15 during a lowering of the lifting carriage 16.

The tool changer 8 thus forms a platform which is equipped with two tools, the first emptying tool 9.1 and the second emptying tool 9.2, namely a finger module (finger 15) and a brush 22. This platform is mounted on two telescopic rails and thus allows this platform to be adjusted in the horizontal direction.

The so-called finger module consists of a vertically aligned linear unit on whose carriage a carrier platform is mounted. A plastics block with millings, for example, into which the plastics rods, i.e., the fingers 15, are embedded, is mounted on this platform.

The fingers are held in position, for example, by stainless steel weights (weights 19) and moved vertically by the linear unit. This allows objects to be transported, such as blood sample tubes (samples), to be ejected from special pneumatic tube capsules 6 provided for this purpose. The weights 19 on the fingers 15 are designed to expel the said samples. If the samples jam inside the pneumatic tube capsule 6, they are nevertheless raised. As soon as this incident occurs, it is detected by sensors (position sensors 21) mounted on the side of the carrier block. The two end positions of the linear unit are specified by software (controller 13 or a separate system controller/PLC).

The second tool is the brush unit. In this case a round brush (brush 22) is attached to the end of a rail 23, on which a gear rack is in turn embedded. The brush 22 can be moved vertically into the two end positions by means of a gear 25 located on a direct current motor 24, for example. The end positions are determined by proximity switches on the base plate and magnets on the gear rack.

The tool selection is made depending on the information stored in the system for the identified pneumatic tube capsule 6. The tool (first emptying tool 9.1 or second emptying tool 9.2) for ejecting the contents is moved vertically from top to bottom through the pneumatic tube capsule 6, which ensures that the pneumatic tube capsule 6 is emptied. After reaching the end position, the selected tool for ejecting the contents is moved vertically from bottom to top back into its starting position.

The second emptying tool 9.2 in this respect comprises a height-adjustable brush 22 which is automatically adjustable in height on a second lifting carriage 26 by means of a second motor 24 and at least in a first height position, in which the brush 22 is in a storage position away from the output point 4 so that a pneumatic tube capsule 6 can be brought to the output point 4 by means of the gripping device 5, and a second height position, in which a pneumatic tube capsule 6 positioned and opened at the output point 4 is penetrated by the brush 22.

Figure 3:
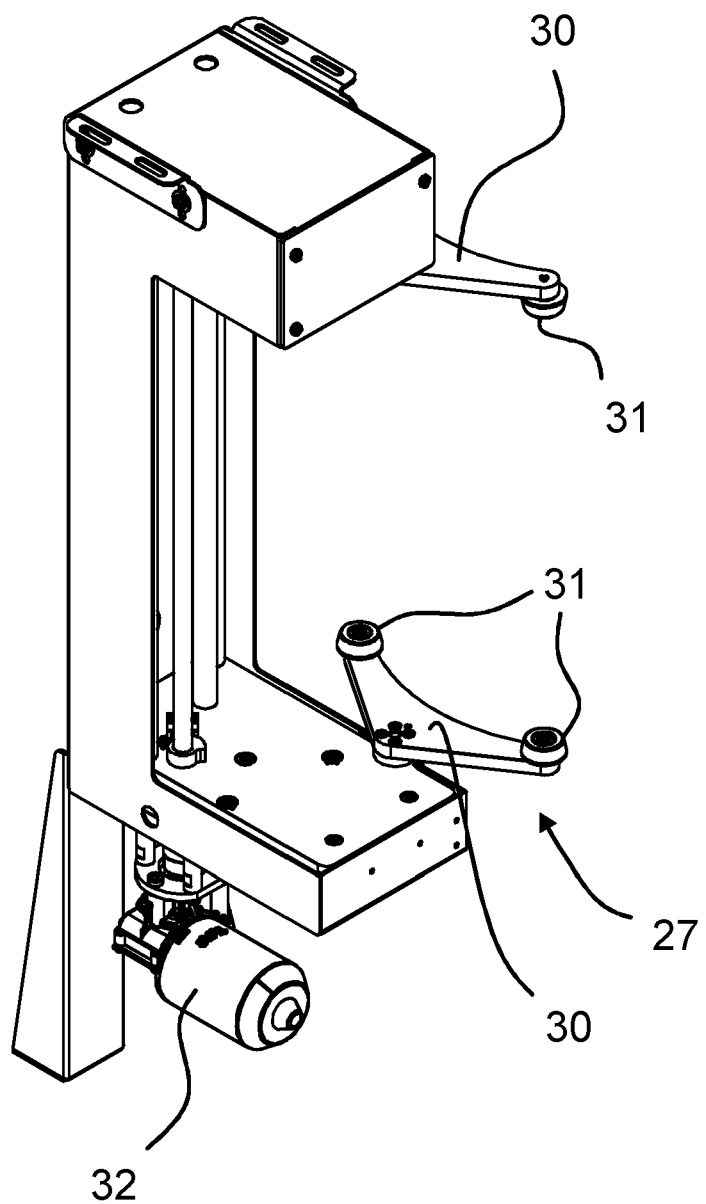
FIG. 3 is a perspective partial view of an exemplary inventive opening device of the pneumatic dispatch station according to FIG. 1.

The pneumatic dispatch station 1 has, as shown in particular in FIG. 3, an opening device 27 assigned to the output point 4 which is configured both to open a first capsule cover 6a present at the upper end of the pneumatic tube capsule 6 and to open a second capsule cover 6b present at the opposite lower end of the pneumatic tube capsule 6.

The moving and opening mechanism consists of two system assemblies that work together in the station. In this case, the linear unit, driven by a stepping motor, carries out a horizontal travel path in the direction of the opening mechanism (opening device 27). The gripper (gripping device 5) located on the linear unit is driven by a (direct current) geared motor combination. Gripper arms 28.1, 28.2 pick up the pneumatic tube capsule 6 and transport it. In order to close these gripper arms 28.1, 28.2 only in accordance with the diameter of the capsule, and to be able to pass through the pneumatic tube capsule 6 at the sending elevator when the gripper arms 28.1, 28.2 are open, sensors 29 below an index disk are read out.

Brought into position (the position can be specified by software) on the opening mechanism (opening device 27), the capsule covers 6a, 6b are turned with a rotary movement of 180 degrees about the axis of rotation of the capsule cover attachment by means of the guide rollers 31 on the pivot arms 30 (FIG. 3). The direction of rotation is carried out inversely by means of a drive motor 32 in order to move the opposite capsule covers 6a, 6b into the relevant open position. A shaft here connects the two gears of the opening forks (swivel arms 30). The end position is detected by corresponding sensors on the cams located on the drive shafts. Analogous to the opening operation of the pneumatic tube capsule 6, the capsule covers 6a, 6b are closed in the opposite direction of rotation.

Figure 7A:
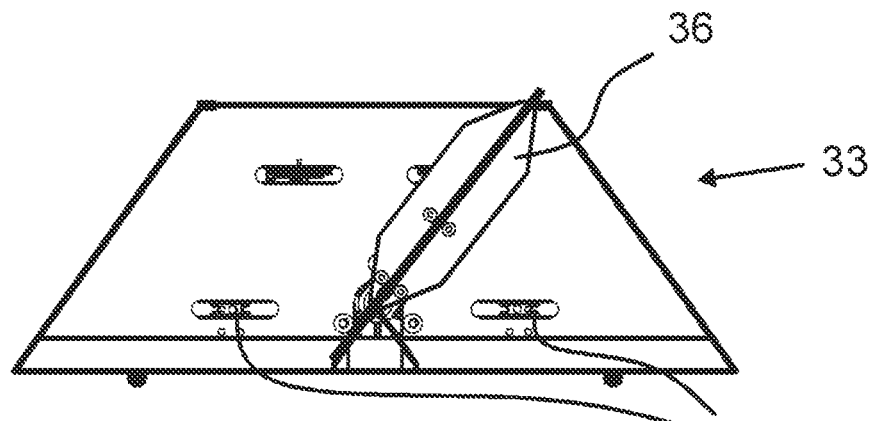
FIG. 7a is a sectional view of an exemplary inventive embodiment of a separator.
Figure 7B:
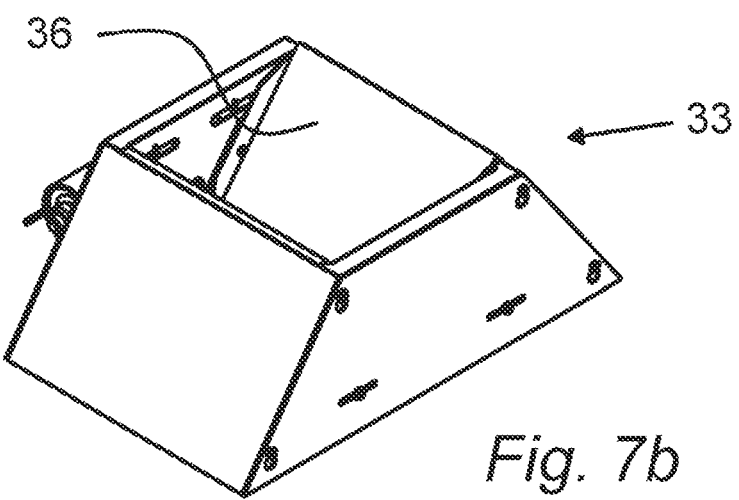
FIG. 7b is a perspective illustration of the separator according to FIG. 7a in a view from above.
Figure 7C:
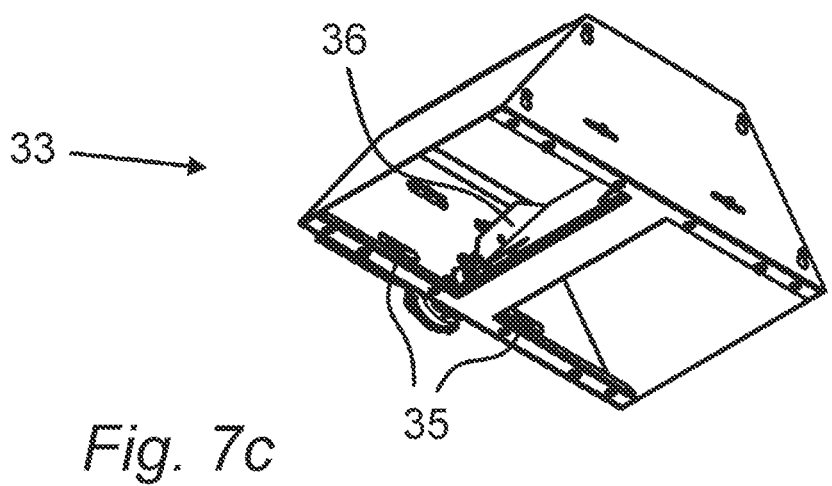
FIG. 7c is a perspective illustration of the separator according to FIG. 7a in a view from below.

The pneumatic dispatch station 1 as shown in FIGS. 7a to 7c, comprises a separator 33 which is arranged below the output point 4 and is configured, depending on the information from the information carrier 12 of the pneumatic tube capsule 6 that has arrived at the pneumatic dispatch station 1 that is read by the information acquisition device 11, to output the object to be transported that is output from the pneumatic tube capsule 6 by means of the first emptying tool 9.1 or the second emptying tool 9.2 either into a first output chute 34.1 of the pneumatic dispatch station 1 or into a second output chute 34.2 of the pneumatic dispatch station 1 that differs from the first output chute 34.1.

In the case of the present embodiment, the separator 33 additionally has two fault sensors 35, which are designed to detect an object to be transported stuck on the separator 33 and to generate a fault signal indicating the fault.

With the arrival of the pneumatic tube capsule 6 at the pneumatic tube station 1, the preparation of the separator 33 at the first position or the second position is also initiated in parallel depending on the information stored in the system for the current transport. The separator 33 located under the opening mechanism (opening device 27) allows the received content to be separated, for example according to criteria specified by the customer. The two positions of a moving, i.e., adjustable, plate 36 are also detected by proximity switches and a magnet located on the plate 36.

What is claimed is:

1. A pneumatic dispatch station, comprising:
   a station housing with a receiving point and an output point;
   a gripping device which can be moved automatically within the station housing between the receiving point and the output point;
   the gripping device designed to automatically grip a pneumatic tube capsule that has arrived at the receiving point and to move the gripped capsule to the output point;
   at least one removal point adjacent the output point;

a tool changer assigned to the output point and comprising:
  at least one first emptying tool,
  a second emptying tool that differs from the first emptying tool, and
  a drive device designed to automatically move the first emptying tool or the second emptying tool into a working position in which the moved emptying tool is aligned with respect to a pneumatic tube capsule positioned at the output point whereby, by an actuating movement of the selected emptying tool, a transported object that is present in the pneumatic tube capsule is output from the pneumatic tube capsule and reaches the removal point.

2. The pneumatic dispatch station of claim 1, further comprising:
an information acquisition device designed to detect an information carrier of a pneumatic tube capsule that has arrived at the pneumatic dispatch station by reading at least one piece of information from the information carrier;
the drive device of the tool changer designed to automatically move either the first emptying tool or the second emptying tool into the working position under the control of a control device and based on the information read by the information acquisition device.

3. The pneumatic dispatch station of claim 1, wherein:
the tool changer comprises a carriage that is automatically adjustable in the station housing and on which the first emptying tool and the second emptying tool are arranged adjacent to one another;
the carriage being adjustable to and between a first carriage position, in which the first emptying tool is in the working position, and a second carriage position, in which the second emptying tool is in the working position.

4. The pneumatic dispatch station of claim 1, wherein the first emptying tool comprises at least one height-adjustable finger that is automatically height-adjustable on a first lifting carriage by a first motor.

5. The pneumatic dispatch station of claim 4, wherein the at least one height-adjustable finger is adjustable into at least:
a first height position, in which the at least one finger is in a storage position away from the output point such that a pneumatic tube capsule can be brought to the output point by the gripping device; and
a second height position, in which the at least one finger engages in a pneumatic tube capsule that is positioned and opened at the output point in order to output a transported object present in the pneumatic tube capsule.

6. The pneumatic dispatch station of claim 5, wherein:
the at least one finger is mounted so as to be vertically displaceable in a finger guide connected to the first lifting carriage;
an upper end of the at least one finger includes at least one of a weight or a stop;
at least one of the at least one finger, the weight, or the stop being designed to drive the at least one finger into the second height position by gravitational action of the dead weight of the at least one finger, of the weight, or of the stop; and
due to the height-adjustable mounting, the at least one finger is displaceable via the finger guide in a direction of the first height position when the lifting carriage moves downward and the output force required to output the transported object from the pneumatic tube capsule exceeds a weight structurally predetermined by the dead weight of at least one of the at least one finger, the weight, or the stop.

7. The pneumatic dispatch station of claim 6, further comprising:
a position sensor assigned to the at least one finger and designed to detect a lifting of the at least one finger relative to the finger guide in response to the finger guide moving from the first height position to the second height position during the lowering of the lifting carriage.

8. The pneumatic dispatch station of claim 1, wherein:
the second emptying tool comprises a height-adjustable brush that is automatically adjustable in height on a second lifting carriage by a second motor;
the height-adjustable brush being adjustable into at least:
  a first height position, in which the brush is in a storage position away from the output point so that a pneumatic tube capsule can be brought to the output point by the gripping device, and
  a second height position, in which a pneumatic tube capsule that is positioned and opened at the output point is penetrated by the brush.

9. The pneumatic dispatch station of claim 1, further comprising an opening device assigned to the output point and designed to open a first capsule cover present at an upper end of the pneumatic tube capsule, and to open a second capsule cover present at an opposite, lower end of the pneumatic tube capsule.

10. The pneumatic dispatch station of claim 2, further comprising:
a first output chute;
a second output chute different from the first output chute; and
a separator arranged below the output point and configured to direct the transported object that is output from the pneumatic tube capsule by the first emptying tool or the second emptying tool, into the first output chute or into the second output chute based on the information from the information carrier that is read by the information acquisition device.

11. The pneumatic dispatch station of claim 10, wherein at least one of the output point, the removal point, or the separator comprises a fault sensor designed to:
detect a transported object that is stuck at at least one of the output point, the removal point, or the separator; and
generate a fault signal indicating the fault.

* * * * *